(12) United States Patent
Yoshimura et al.

(10) Patent No.: US 7,617,021 B2
(45) Date of Patent: *Nov. 10, 2009

(54) RADIO COMMUNICATION SYSTEM FOR CONTROLLING A VEHICLE

(75) Inventors: Kentaro Yoshimura, Paris (FR); Yuichiro Morita, Hitachi (JP); Takanori Shimura, Chiba (JP); Masayuki Miyazaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/350,553

(22) Filed: Jan. 8, 2009

(65) Prior Publication Data

US 2009/0118898 A1  May 7, 2009

Related U.S. Application Data

(63) Continuation of application No. 11/206,828, filed on Aug. 19, 2005.

(30) Foreign Application Priority Data

Oct. 27, 2004 (JP) .............................. 2004-311729

(51) Int. Cl.
*H04B 7/26* (2006.01)
*G06F 17/00* (2006.01)

(52) U.S. Cl. .............................. 701/1; 701/36; 370/235

(58) Field of Classification Search ....................... None
See application file for complete search history.

(56) References Cited

U.S. PATENT DOCUMENTS

| | | | | |
|---|---|---|---|---|
| 6,662,091 | B2 * | 12/2003 | Wilson et al. ................. | 701/33 |
| 6,947,760 | B2 * | 9/2005 | Weisshaar et al. ............ | 455/509 |
| 7,286,928 | B2 * | 10/2007 | Spengler ...................... | 701/115 |
| 2003/0043750 | A1 * | 3/2003 | Remboski et al. ........... | 370/242 |
| 2003/0043799 | A1 * | 3/2003 | Reinold et al. .............. | 370/389 |
| 2005/0213548 | A1 * | 9/2005 | Benson et al. ............... | 370/338 |

FOREIGN PATENT DOCUMENTS

| JP | 2003-002019 | * | 1/2003 |
|---|---|---|---|
| JP | 2003-229798 | * | 8/2003 |

* cited by examiner

*Primary Examiner*—Michael J. Zanelli
(74) *Attorney, Agent, or Firm*—Crowell & Moring LLP (57) ABSTRACT

A radio control system for controlling a vehicle includes a transmission node for transmitting vehicle control data, the vehicle control data including at least one of a measured value of a vehicle state or a driver's manipulated variable and a control target value of a control actuator in the vehicle, a reception node for receiving the vehicle control data, and a plurality of radio communication routes between the transmission node and the reception node. A radio communication route that satisfies communication limit time of transmission data including the vehicle control data and satisfies lowest required reliability of the transmission data is selected from among the radio communication routes.

17 Claims, 10 Drawing Sheets

| TRANSMISSION DATA | REQUIRED RELIABILITY | TRANSMISSION TIME | ROUTE EVALUATION EXPRESSION |
|---|---|---|---|
| INTAKE AIR TEMPERATURE | B | 100 [ms] | $F = kB * \text{RELIABILITY} + mB * \text{COMMUNICATION TIME}$ |
| INTAKE AIRFLOW RATE | A | 10 [ms] | $F = kA * \text{RELIABILITY} + mA * \text{COMMUNICATION TIME}$ |

FIG.7

| REQUIRED RELIABILITY | ALLOWABLE FAILURE RATE |
|---|---|
| A | $10^{-12}$ |
| B | $10^{-9}$ |
| C | $10^{-6}$ |

| ROUTE NO. | TRANSMISSION DATA, REQUIRED RELIABILITY, REQUIRED COMMUNICATION TIME | ROUTE: SIGNAL STRENGTH, PROTOCOL | RELAY POINT: RELIABILITY | ROUTE: SIGNAL STRENGTH, PROTOCOL | COMMUNICATION ROUTE RELIABILITY EVALUATION, COMMUNICATION TIME |
|---|---|---|---|---|---|
| 1 | INTAKE AIR TEMPERATURE, B, 100 [MS] | 215 : C, A | — | — | C, 5 [ms] |
| 2 | | 213 : A, A | 103 : A | 235 : A, A | A, 10 [ms] |
| 3 | | 214 : A, B | 104 : B | 245 : A, B | B, 10 [ms] |
| 4 | INTAKE AIR FLOW A, 10 [MS] | 225 : C, A | — | — | C, 5 [ms] |
| 5 | | 223 : A, A | 103 : A | 235 : A, A | A, 10 [ms] |
| 6 | | 224 : A, B | 104 : B | 245 : A, B | B, 10 [ms] |

| ROUTE NO. | TRANSMISSION DATA, REQUIRED RELIABILITY, REQUIRED COMMUNICATION TIME | ROUTE: SIGNAL STRENGTH, PROTOCOL | RELAY POINT: RELIABILITY | ROUTE: SIGNAL STRENGTH, PROTOCOL | COMMUNICATION ROUTE RELIABILITY EVALUATION |
|---|---|---|---|---|---|
| 3-1 | INTAKE AIR TEMPERATURE, B, 100 [MS] | 214: A, C | 104: B | 245: A, C | C |
| 3-2 | | 214: A, B | 104: B | 245: A, B | B |

FIG.13

| ROUTE NO. | TRANSMISSION DATA, REQUIRED RELIABILITY, REQUIRED COMMUNICATION TIME | ROUTE: SIGNAL STRENGTH, PROTOCOL | RELAY POINT: RELIABILITY | ROUTE: SIGNAL STRENGTH, PROTOCOL | COMMUNICATION ROUTE RELIABILITY EVALUATION |
|---|---|---|---|---|---|
| 3-3 | INTAKE AIR TEMPERATURE, B, 100 [MS] | 214 : C, B | 104 : B | 245 : A, B | C |
| 3-4 | | 214 : A, B | 104 : B | 245 : A, B | B |

FIG.14

| D1 | D7 | D2 | D3 | D4 | D5 | D6 |
|---|---|---|---|---|---|---|
| PROTOCOL INFORMATION | DESTINATION | VEHICLE ID | COMMUNICATION ROUTE | ERROR STATE | TRANSMISSION DATA | ERROR CORRECTION CODE |

RADIO COMMUNICATION SYSTEM FOR CONTROLLING A VEHICLE

This application is a continuation of U.S. patent application Ser. No. 11/206,828, filed Aug. 19, 2005, the entire disclosure of which is incorporated herein by reference, which in turn claims priority under 35 U.S.C. § 119 of prior Japanese application no. 2004-311729, filed Oct. 27, 2004.

BACKGROUND OF THE INVENTION

The present invention relates to a system for transmitting and receiving data by communication in a vehicle control system. In particular, the present invention relates to a vehicle control radio communication system for controlling the vehicle by using radio communication.

As a conventional radio communication system, there is a method of detecting a transmission quality of a transmission line from a plurality of relay routes, storing the information about the transmission qualities of the relay routes in a quality descending order, selecting a relay route having the best transmission quality at the time of data transmission, and transmitting data (see, for example, JP-A-2003-229798 (P. 9 and FIG. 7)).

As for a communication system intended for vehicles, a technique for conducting communication between a sensor and a control unit by radio in order to measure an air pressure in a tire which is a rotating body is disclosed (see, for example, JP-A-2003-002019).

SUMMARY OF THE INVENTION

As a kind of a vehicle control apparatus, there is, for example, an electronic vehicle control system which senses a state quantity of a control object such as a quantity of driver's operation on driving means such as an acceleration pedal or an airflow rate of intake manifold of engine by using a sensor, transfers a sensing signal converted to an electric signal by the sensor to an electronic control unit (hereafter referred to as ECU) in a vehicle, and controls the vehicle by using an electronic control throttle and electronically controlled fuel injection valves. As compared with conventional systems in which transfer is conducted by a mechanical mechanism or a hydraulic mechanism, the following can be mentioned as advantages of the electronic vehicle control system: flexible and sophisticated unified running control using a computer can be implemented; the weight of the vehicle can be decreased; and it becomes possible to extend design freedom.

On the other hand, in the conventional vehicle control system, signals of sensors for monitoring the manipulated variables of control pedals and so on given by the driver and the vehicle state are input to the ECU via wires, and control signals directed to a throttle serving as a vehicle control actuator and so on are output from the ECU by wires. A wire portion between the ECU and the sensor & actuator portion is called wire harness. The environment in which the ECU is placed is an environment exposed to dust and raindrops, such as an engine compartment of the vehicle. Therefore, very high reliability is required of a connection portion between the wire harness and the ECU. Pursuing the reliability leads to an increase in component costs.

Furthermore, if the combination of the sensors and actuators connected to the ECU is altered, not only control software on the ECU but also the wire harness must be altered because of the wire connection, resulting in a problem of poor expandability. Furthermore, it is difficult to apply the wire harness to regions where wire connection is difficult, such as an air pressure sensor in a tire which is a rotating body. Furthermore, a problem of fuel cost aggravation is also caused by an increase in weight of the wire harness itself.

As described in JP-A-2003-002019, a technique for replacing the wire harness between the ECU and the sensor & actuator portion with radio communication in order to solve the problems is known. In JP-A-2003-002019, however, attention is not paid to the fact that there are a plurality of routes as regards a relay route for a radio communication signal. Even if one of relay points fails, it is effective in improving the failure resistance to transmit data via another relay point. However, the conventional radio communication system as described in JP-A-2003-229798 is the so-called nonreal time communication system in which limitation of the time for transmitting the information is not severe, although it is considered to transmit information certainly.

Therefore, the real time property i.e., the transmission time limit is not regarded as important in the conventional system. As it is, therefore, it is difficult to apply the conventional radio communication system described in JP-A-2003-229798 to a communication system for real time control system such as a vehicle control system. The reason will now be described. If each communication node is always controlled so as to use a relay route having a high transmission quality (reliability) preferentially, communication data concentrate to a relay route having a high transmission quality. Since congestion occurs in the relay route, the possibility of a delay being caused in communication in the relay route becomes high. In the case of the vehicle control system, there are also vehicle control operations for which requirement concerning the real time property is very strict. For example, if a brake pedal is depressed, the actual braking must start in a short constant time. Therefore, the congestion on the radio communication route becomes a great problem. In the conventional radio communication system, there is a problem that the reliability of the communication such as the transmission quality is difficult to be consistent with the real time property (i.e., real time response property) as heretofore described.

An object of the present invention is to provide a vehicle control radio communication system capable of solving the problems and reconciling the reliability concerning the communication and the real time property.

The object is achieved by a radio control system for controlling a vehicle, including a transmission node for transmitting vehicle control data, the vehicle control data including at least one of a measured value of a vehicle state or a driver's manipulated variable and a control target value of a control actuator in the vehicle, a reception node for receiving the vehicle control data, a plurality of radio communication routes between the transmission node and the reception node, and load distribution means for selecting a radio communication route that satisfies communication limit time of transmission data including the vehicle control data and satisfies the lowest required reliability of the transmission data, from among the radio communication routes.

According to the present invention, the load in the radio transmission line can be distributed by associating reliability required of data with reliability of a radio communication route and selecting a radio communication route. The real time property (real time response property) and reliability concerning the radio transmission in the vehicle control radio communication system can be ensured.

Other objects, features and advantages of the invention will become apparent from the following description of the embodiments of the invention taken in conjunction with the accompanying drawings.

DESCRIPTION OF THE EMBODIMENTS

Figure 1:
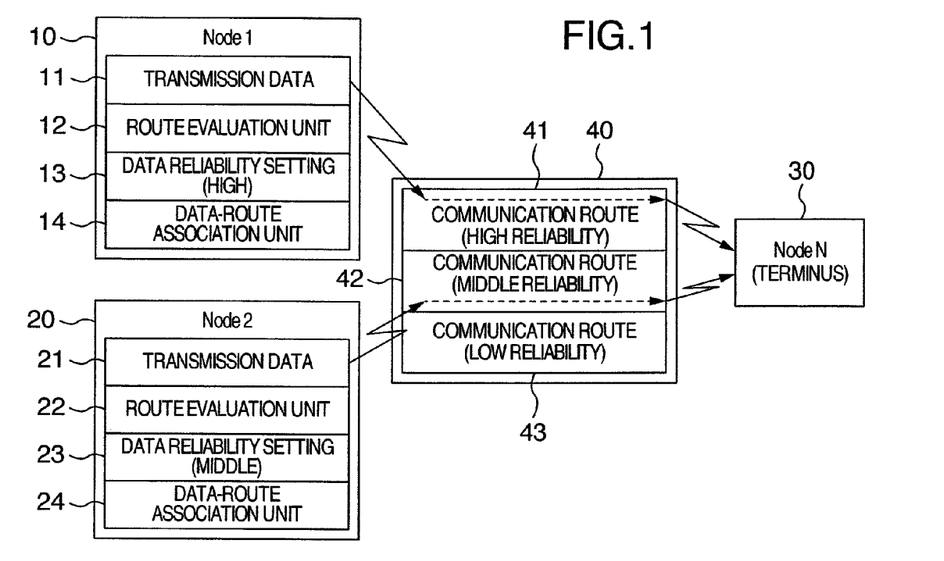
FIG. 1 is a diagram showing a configuration example of a vehicle control radio communication system according to an embodiment of the present invention.

Hereafter, a vehicle control radio communication system according to an embodiment of the present invention will be described with reference to the drawings. FIG. 1 is a diagram showing an outline of a system configuration example of a vehicle control radio communication system according to an embodiment of the present invention. As shown in FIG. 1, the radio communication system according to the present embodiment includes a first transmission node (node 1) 10, a second transmission node (node 2) 20, a reception node (node N) 30, and a communication route 40. The number of transmission nodes and reception node is nothing but an example. Typically, at least one sensor is provided in each node.

As shown in FIG. 1, the first transmission node 10 includes transmission data 11, a route evaluation unit 12 for evaluating the reliability and communication time of a communication relay route, a data reliability setting unit 13 for setting reliability required of the transmission data 11, and a data-route association unit 14 for selecting a communication relay route so as to associate it with the transmission data 11. By the way, in the first transmission node 10, "high" is set in the data reliability setting unit 13. Typically, the radio communication route 40 includes at least one relay node. However, direct communication without intervention of a relay node is also included. In the example shown in FIG. 1, a radio communication route 40 includes a radio communication route 41 having high reliability, a radio communication route 42 having middle reliability, and a radio communication route 43 having low reliability.

The first transmission node 10 evaluates communication time and reliability of the communication relay route 40 by using its own route evaluation unit 12. By using the data-route association unit 14, the first transmission node 10 selects the radio communication route 41 having the reliability "high" which is a route satisfying the reliability preset in the data reliability setting unit 13 from among a plurality of radio communication routes (denoted by reference numerals 41 to 43 in FIG. 1) satisfying a communication limit time preset in the transmission data 11. And the first transmission node 10 transmits the transmission data 11 to the reception node 30 by using the radio communication route 41.

The second transmission node (node 2) 20 includes transmission data 21, a route evaluation unit 22 for evaluating the reliability and communication time of a communication relay route, a data reliability setting unit 23 for setting reliability required of the transmission data 21, and a data-route association unit 24 for selecting a radio communication route so as to associate it with the transmission data 22. By the way, reliability "medium" is set in the data reliability setting unit 23.

The second transmission node 20 evaluates communication time and reliability of the communication relay route 40 inclusive of a relay node in the communication relay route 40 by using the route evaluation unit 22. By using the data-route association unit 24, the second transmission node 20 selects the communication route 42 having the reliability "middle" which is a route satisfying the reliability preset in the data reliability setting unit 13 as a route satisfying reliability preset in the data reliability setting unit 23 from among a plurality of radio communication routes satisfying a communication limit time preset in the transmission data 21. And the second transmission node 20 transmits the transmission data 21 to the reception node 30 by using the radio communication route 42.

Owing to the configuration described heretofore, it is possible to select reliability of a radio communication route that satisfies the required communication time and that depends on the reliability preset in the transmission data, i.e., that is commensurate with the reliability preset in the transmission data (so as to prevent concentration to a radio communication route having high reliability). By conducting such selection, the communication load can be distributed within the radio communication network without concentrating communication to a radio communication route having high reliability, and the real time response property (real time property) of the communication can be ensured. In other words, when load distribution control such as the radio communication technique according to the present embodiment is not conducted even if radio communication routes satisfy the requirement of the communication time at the time of evaluation, there is a fear that the load will concentrates to a certain radio communication route and a communication delay based on congestion will occur. In the radio communication technique according to the present embodiment, load distribution is conducted with due regard to the reliability of the transmission data. Therefore, the radio communication technique according to the present embodiment is suitable for the vehicle control system which is required to have high reliability and real time property.

Figure 2:
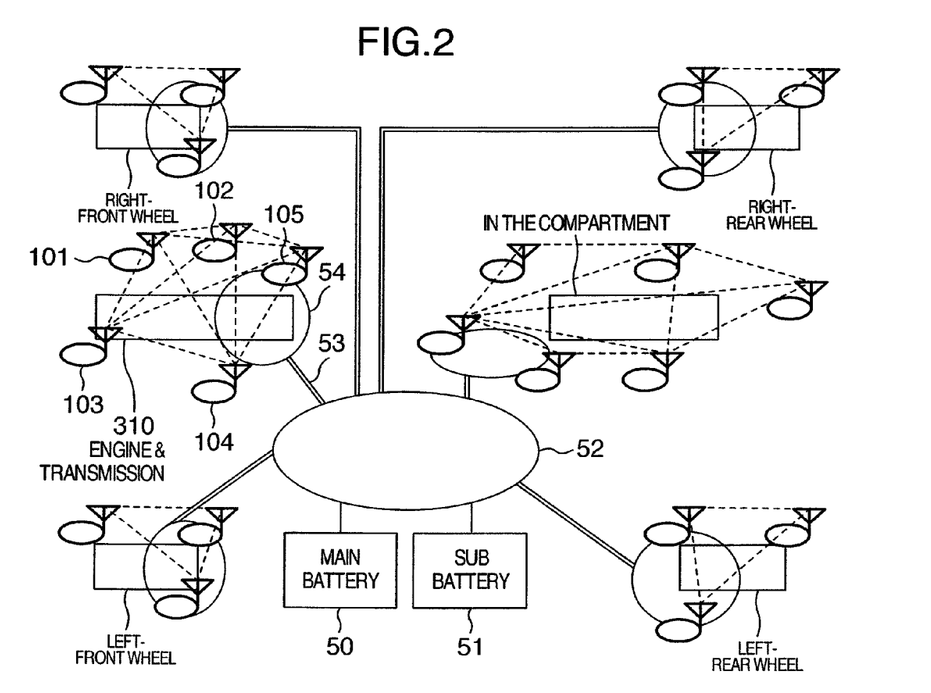
FIG. 2 is a diagram showing a concrete configuration example of a vehicle control radio communication system according to the present embodiment.

FIG. 2 is a diagram showing a more specific configuration example of a vehicle control radio communication system according to the present embodiment. As shown in FIG. 2, a radio communication subsystem concerning an engine & transmission unit 310 is formed of radio communication nodes 101 to 105. Mutual radio communication is possible among the radio communication nodes 101 to 105. As for power supply, the battery has a dual system including a main battery 50 and a sub battery 51 in order to prevent the electric power interruption and uncontrollable state from being caused by a failure. Even if abnormality occurs in the function of one of the main battery 50 and a sub battery 51, power supply of the lowest power supply is secured. As for electric power lines, each of a basic electric power line 52 and an engine/transmission sub electric power network 54 is formed as a ring network. An electric power line 53 for connecting the basic electric power network to the sub electric power network is formed as a dual system. Even if an electric power line in one place is broken, the electric power can be sent. By the way, the electric power line is not connected to all radio communication nodes, but connected only to nodes that are large in electric power dissipation, such as the ECU for conducting the control variable arithmetic operation and actuator nodes for controlling the actuators. As for nodes that are small in electric power dissipation, such as sensor nodes for conducting processing of sensors, electric power line is made unnecessary by a self power generation system using a vibration power generation element or a thermal power generation element.

The inside of the compartment, right front wheel, left front wheel, right rear wheel, left rear wheel and so on also form subnetworks. Each of these other subnetworks also has a configuration similar to that of the engine-transmission subnetwork.

Figure 3:
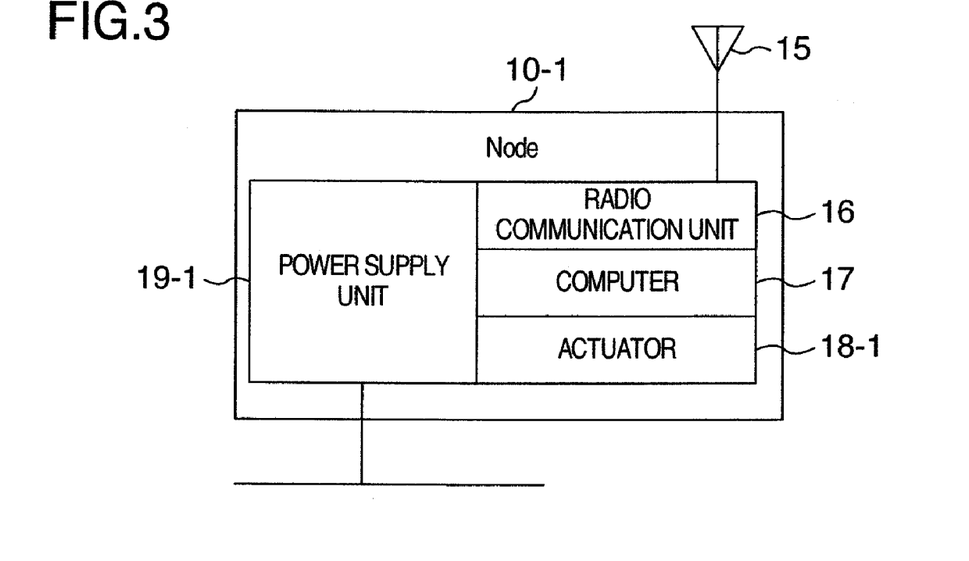
FIG. 3 is a schematic diagram of a communication node (an actuator and an ECU) in the vehicle control radio communication system according to the present embodiment.

FIG. 3 is a diagram showing a configuration example of an actuator node or the ECU according to the present embodiment. An actuator node 10-1 includes an antenna 15 for radio communication, a radio communication unit 16, a computer 17 for controlling an actuator, an actuator 18-1 for controlling the vehicle, and a power supply unit 19-1. In the case of the ECU, the actuator 18-1 is provided arbitrarily.

Figure 4:
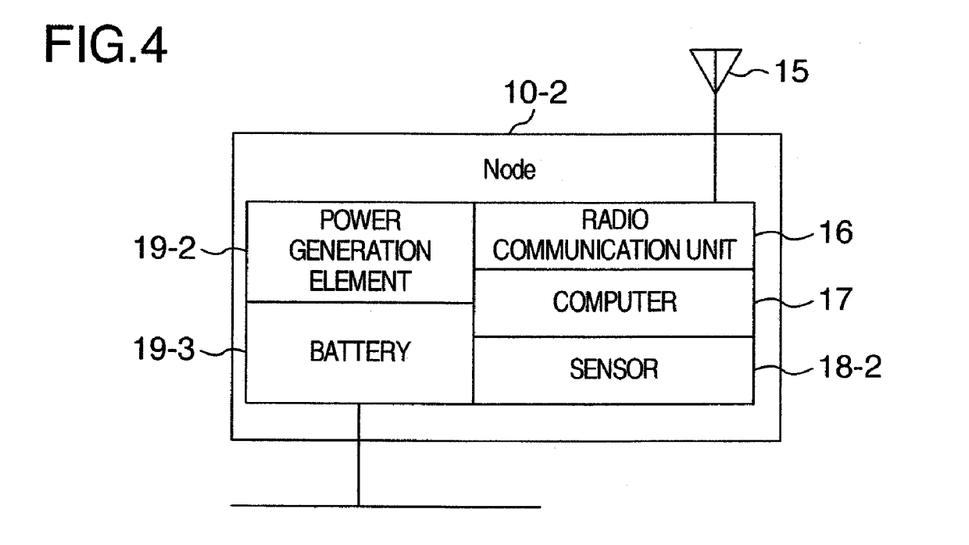
FIG. 4 is a schematic diagram of a communication node (a sensor) in the vehicle control radio communication system according to the present embodiment.

FIG. 4 is a diagram showing a configuration example of a sensor node. As shown in FIG. 4, a sensor node 10-2 includes a radio communication antenna 15, a radio communication unit 16, a computer 17 for conducting sensor signal processing and transmission data calculation, a sensor 18-2 for measuring the vehicle state or the driver's manipulation, a power generation element 19-2 for generating electric power by utilizing vibration or heat generated from the engine, and a battery 19-3 for storing the electric power.

Owing to such a configuration, communication between the ECU and actuator nodes and between the ECU and the sensor nodes becomes possible, and it becomes possible to reduce the component cost, reduce the component weight, and improve the scalability of ECU. In other words, since only a power line to the electric power network is required for the ECU and communication lines become unnecessary for the ECU, an effect that hardware restrictions concerning the configuration of sensors and actuators are eliminated is brought about. In addition, electric power lines also become unnecessary for the sensor nodes. Even if a sensor is attached to a rotating body, therefore, the electric power line does not become obstructive. Accordingly, it becomes easy to attach the sensor to a moving body such as a rotating body.

Figure 5:
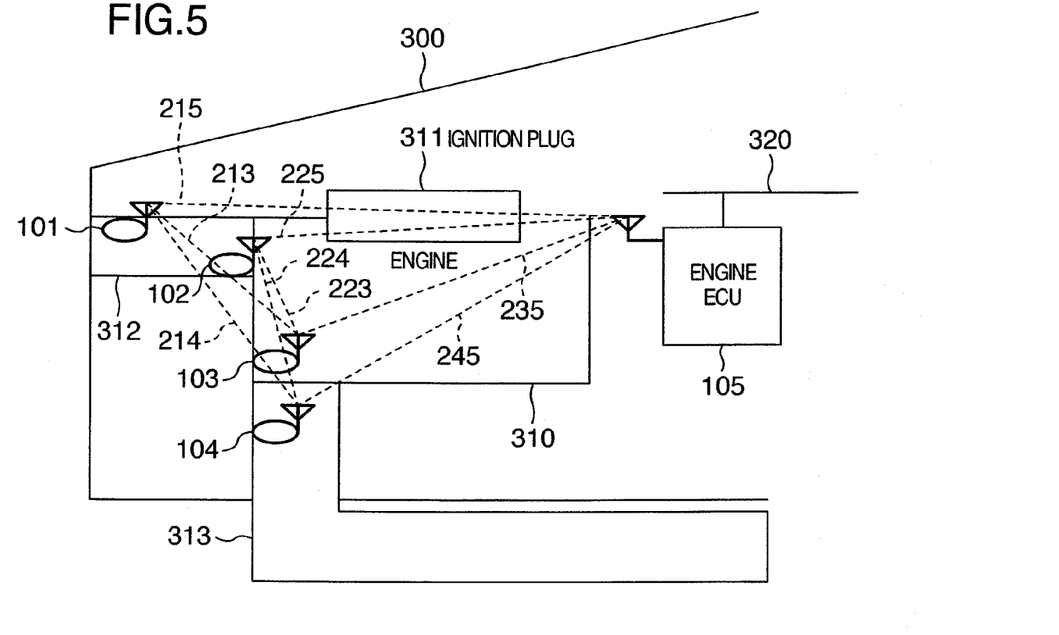
FIG. 5 is a diagram showing a configuration example of a radio communication system in an engine control unit.

FIG. 5 is a diagram showing a configuration example of a radio communication subsystem in an engine unit. As shown in FIG. 5, the radio communication subsystem in the engine unit includes a vehicle body 300, an engine 310, an ignition plug 311, an intake pipe 312, an exhaust pipe 313, a wire basic communication bus 320, an intake air temperature sensor node 101, an intake air flow sensor node 102, a crank angle sensor node 103, an exhaust oxygen sensor node 104, and an engine ECU 105. The sensor nodes 101 to 104 transmit measured sensor information to the engine ECU 105. In the configuration shown in FIG. 5, the ignition plug 311 is installed between the intake air temperature sensor node 101 and the engine ECU 105, and between the intake air flow sensor node 102 and the engine ECU 105. The ignition plug 311 becomes a very strong noise generation source. Therefore, it is necessary to conduct the radio communication while bypassing the ignition plug 311.

The engine ECU 105 serves as a server for the radio communication subsystem within the engine, and conducts communication route setting and so on. It is necessary for the engine ECU 105 to conduct communication with other ECUs, such as a brake ECU and an intra-compartment ECU, which are not illustrated. Because of the large distance and the large communication quantity, a wire communication means 320 such as the CAN or the FlexRay is used.

Figure 6:
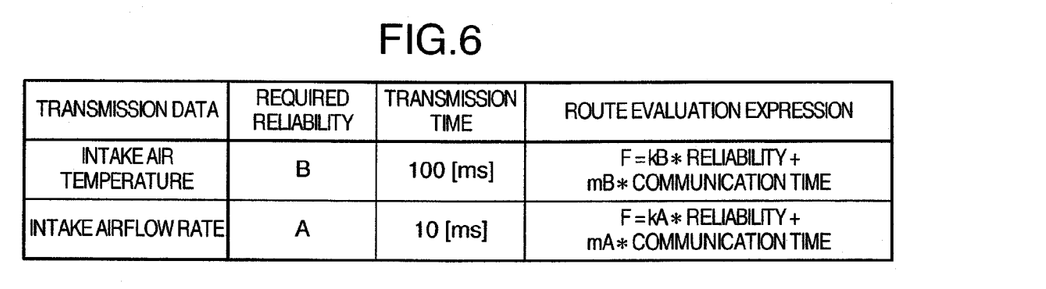
FIG. 6 is a diagram showing attribute information of transmission data.

FIG. 6 is a diagram showing an example of an evaluation table used when selecting a route of transmission data stored in the engine ECU. The "intake air temperature" is data required for control. Even if there is an error in the "intake air temperature," it does not have direct influence on persons in the vehicle. Therefore, the required reliability of the "intake air temperature" is B. Since its temporal change is typically slow, transmission limit time is set equal to 100 ms. As for a route evaluation expression, a route evaluation value F is calculated by using coefficients kB and mB unique to the "intake air temperature."

The "intake air flow rate" is data required for control. If there is an error in the "intake air flow rate," there is a possibility of leading to runaway of the motor. Therefore, the required reliability of the "intake air flow rate" is A. Since its temporal change is fast, transmission limit time is set equal to 10 ms. As for the route evaluation expression, a route evaluation value F is subject to weighted calculation by using coefficients kA and mA unique to the "intake air flow rate" as shown in FIG. 6.

Figure 7:
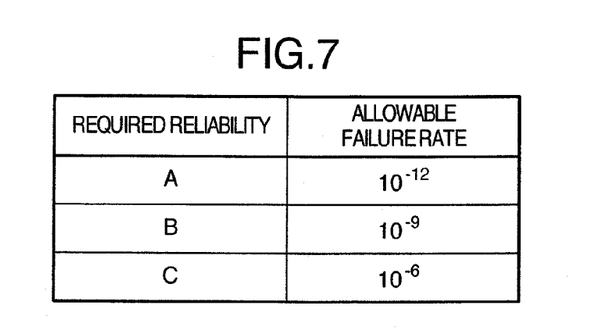
FIG. 7 is a diagram showing association of required reliability with allowable failure rate.

FIG. 7 is a diagram showing an example of the required reliability shown in FIG. 6. In the required reliability A, an allowable failure rate in control is, for example, $10^{-12}$ when a communication error has occurred. In the required reliability B, an allowable failure rate in control is, for example, $10^{-9}$ when a communication error has occurred. In required reliability C, an allowable failure rate in control is, for example, $10^{-6}$ when a communication error has occurred. In this way, the allowable failure rate is classified into A to C on the basis of some thresholds.

Figure 8:
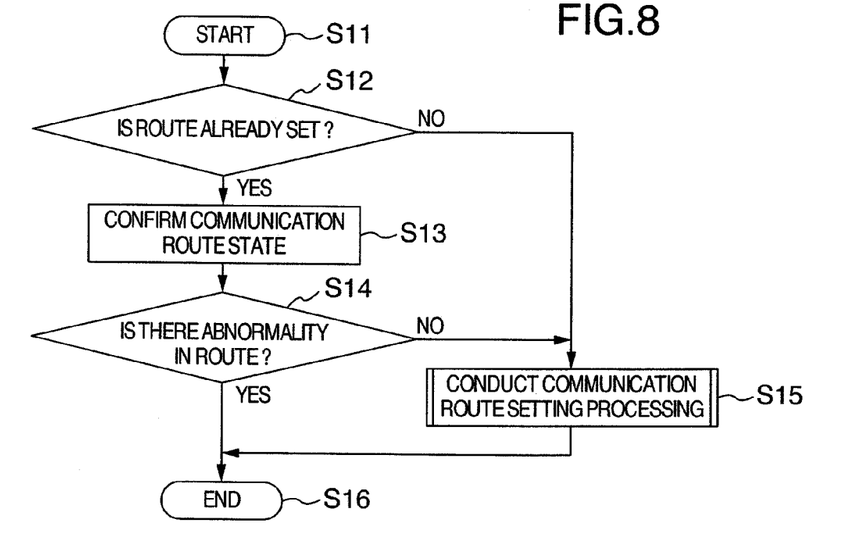
FIG. 8 is a flow chart diagram showing a flow of server node start processing.

FIG. 8 is a flow chart diagram showing a flow of start processing executed when the engine ECU 105 is started. If the ECU is started, processing is started from step S11 as shown in FIG. 8 (START). It is checked whether a route is already set at step S12. If the route is set (yes), the processing proceeds to step S13. If the route is not set (no) because the vehicle has just been shipped from a factory, initialization processing has just been conducted in a service factory, or route information has been lost due to some cause, the processing proceeds to a communication route setting processing step S15. At the step S13, the ECU 105 conducts inquiry communication with a communication node as to whether normal operation is possible or as to a state of communication with another node. It is thus verified whether the communication network operates according to the preset route. If there is no abnormality in the route at step S14 as a result of the operation verification conducted at the step S13 (yes), the processing proceeds to step S16 and the start processing is finished. If there is abnormality (no), the processing proceeds to step S15 and communication route setting processing is conducted. Hereafter, the communication route setting processing step S15 will be described in detail.

Figure 9:
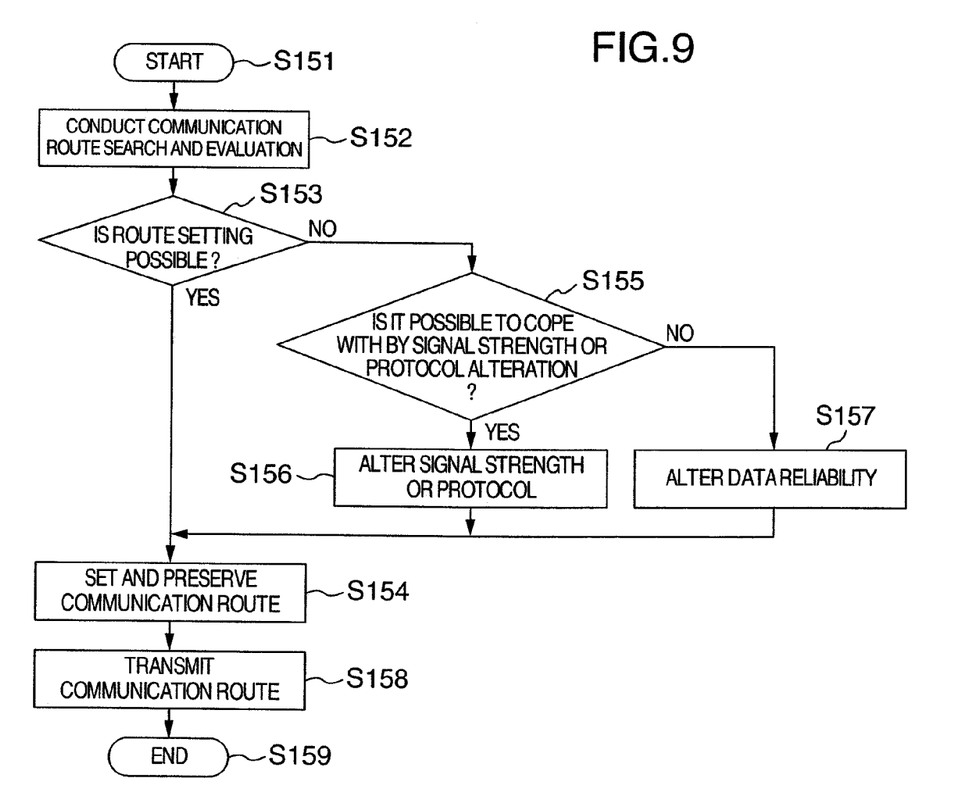
FIG. 9 is a flow chart diagram showing a flow of data transmission processing.

FIG. 9 shows details of the communication route design processing step S15. At step S152, search and evaluation as to whether there is a route satisfying the transmission time and required reliability preset for each transmission data, by using the communication state information obtained at the step S13. The route search and evaluation will be described later in detail. If the communication route setting is possible at step S153 (yes), the processing proceeds to step S154. If the communication route cannot be set (no), the processing proceeds to step S155. At the step S155, it is verified whether the required reliability of the transmission data can be satisfied by altering the signal strength or the communication protocol (such as the error correction scheme). If alteration satisfying the required reliability is possible (yes), the processing proceeds to step S156. Otherwise (no), the processing proceeds to step S157. At the step S156, the signal strength or protocol alteration processing is conducted. At the step S157, data reliability alteration processing is conducted. The signal strength or protocol alteration processing and the data reliability alteration processing will be described later. At the step S154, the set route is preserved in a nonvolatile memory, such as an EEPROM or a flash memory, which is not illustrated. At step S158, the set route is sent to each communication node, and each communication node is notified that the set route should be used at the time of data transmission. At step S159, the communication route setting processing is finished (END).

Figure 10:
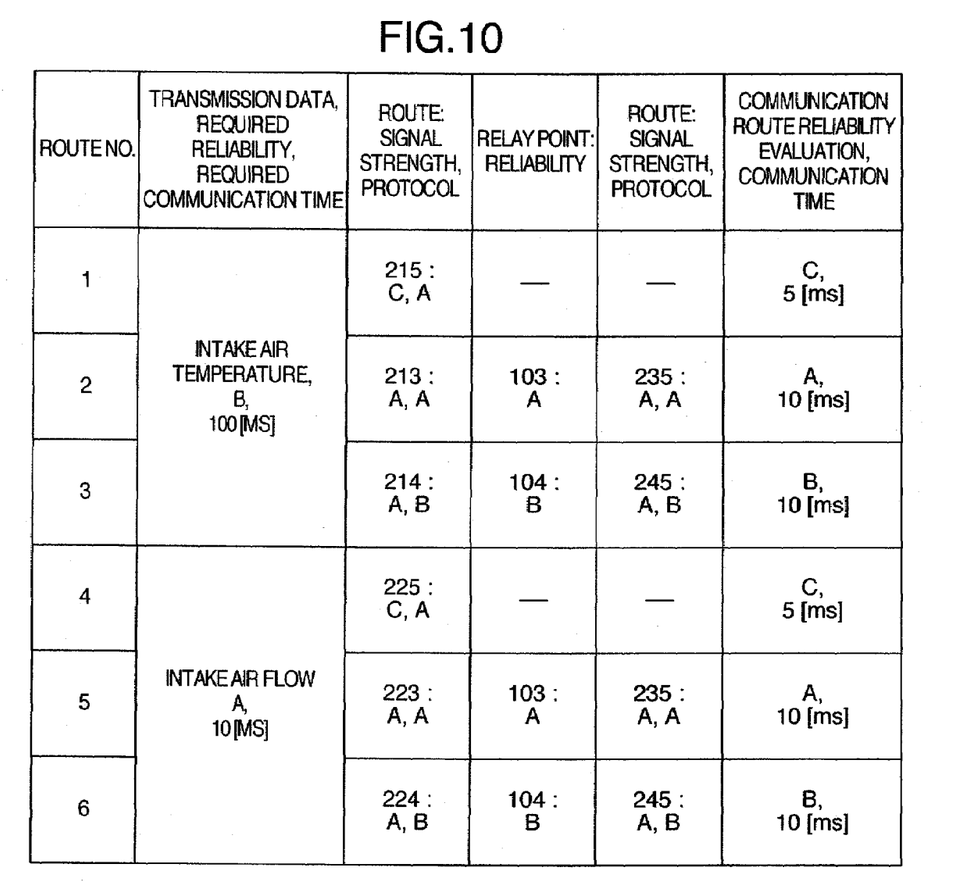
FIG. 10 is a diagram showing an outline of evaluation and selection processing for communication routes.

FIG. 10 is a diagram showing an outline of the communication route search and evaluation processing conducted at the step S152. Routes Nos. 1 to 3 are candidates for the communication route from the intake air temperature sensor node 101 to the ECU node 105 shown in FIG. 2. Data transmitted by the intake air temperature sensor node 101 is the intake air temperature. Its required reliability becomes B, and its communication limit time becomes 100 ms.

In the route No. 1, communication is conducted by using a route 215 for direct communication between the transmission node 101 and the reception node 105. In this case, the route 215 has the interposed ignition plug 311. Therefore, the signal strength is lowered by noise generated by the ignition plug 311, resulting in strength C. As for the communication protocol, a protocol having a high error correction function, such as CRC, is used, resulting in a rank A. As a result, the communication route reliability evaluation becomes C, and the communication time becomes 5 ms.

In the route No. 2, communication is conducted from the transmission node 101 to the reception node 105 via the relay node 103. In a route 213 from the transmission node 101 to the relay node 103, the signal strength becomes A, because there is no noise generation source. The communication protocol becomes the rank A. The failure rate of the relay point 103 itself is very low, and the reliability becomes the rank A. In a route 235 from the relay node 103 to the reception node 105, both the signal strength and the protocol become the rank A. As a result, the communication route reliability evaluation becomes A, and the communication time becomes 10 ms.

In the route No. 3, communication is conducted from the transmission node 101 to the reception node 105 via the relay node 104. In a route 214 from the transmission node 101 to the relay node 104, the signal strength becomes A, because there is no noise generation source. However, the protocol is a communication protocol having only an error check function such as the check sum, resulting in the rank B. The failure rate of the relay point 104 itself is comparatively low, and the reliability becomes the rank B. In a route 245 from the relay node 104 to the reception node 105, the signal strength and the protocol become the rank B. As a result, the communication route reliability evaluation becomes B, and the communication time becomes 10 ms.

On the basis of the results heretofore described, the route No. 3 satisfying the route reliability and the communication time is selected as the route used to transmit data of the intake air temperature by the intake air temperature sensor node 101. At this time, the route No. 2 also satisfies the route reliability and the communication time. However, reliability exceeding the requirement is satisfied. Therefore, the route No. 3 is selected to leave room for data required to have higher reliability to select the route No. 2 as its route.

Routes Nos. 4 to 6 are candidates for the communication route from the intake air flow sensor node 102 to the ECU node 105. Data transmitted by the intake air flow sensor node 102 is the intake air flow. The air flow data requires reliability A, and its communication limit time becomes 10 ms. In the route No. 4, communication is conducted by using a route 225 for direct communication between the transmission node 102 and the reception node 105. In this case, the route 225 has the interposed ignition plug 311. Therefore, the signal strength is lowered by noise generated by the ignition plug 311, resulting in strength C. As for the protocol, a protocol having a high error correction function, such as CRC, is used, resulting in a rank A. As a result, the communication route reliability evaluation becomes C, and the communication time becomes 5 ms.

In the route No. 5, communication is conducted from the transmission node 102 to the reception node 105 via the relay node 103. In a route 223 from the transmission node 102 to the relay node 103, the signal strength becomes A, because there is no noise generation source. The protocol becomes the rank A. The failure rate of the relay point 103 itself is very low, and the reliability becomes the rank A. In a route 235 from the relay node 103 to the reception node 105, both the signal strength and the protocol become the rank A. As a result, the communication route reliability evaluation becomes A, and the communication time becomes 10 ms.

In the route No. 6, communication is conducted from the transmission node 102 to the reception node 105 via the relay node 104. In a route 224 from the transmission node 102 to the relay node 104, the signal strength becomes A, because there is no noise generation source. However, the protocol is a protocol having only an error check function such as the check sum, resulting in the rank B. The failure rate of the relay point 104 itself is comparatively low, and the reliability becomes the rank B. In a route 245 from the relay node 104 to the reception node 105, the signal strength becomes the rank A and the protocol becomes the rank B. As a result, the communication route reliability evaluation becomes B, and the communication time becomes 10 ms. On the basis of the results heretofore described, the route No. 5 satisfying the route reliability and the communication time is selected as the route used to transmit data of the intake air flow by the intake air flow sensor node 102.

Figure 11:
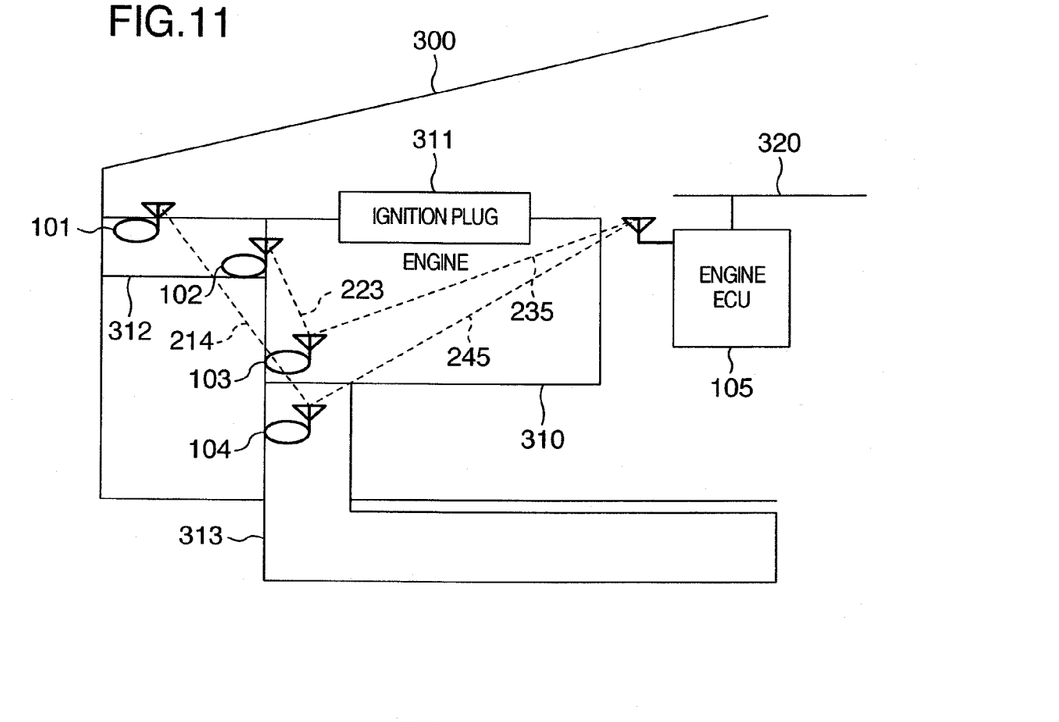
FIG. 11 is a diagram showing a configuration example of a radio communication system in the engine control unit in which a route has been selected by using a vehicle control radio communication system technique according to the present embodiment.

FIG. 11 is a diagram showing routes of the radio communication subnetwork set as heretofore described. In the range from the intake air temperature sensor node 101 to the ECU node 105, data is transmitted via the route 214 and the route 245. In the range from the intake air flow sensor node 102 to the ECU node 105, data is transmitted via the route 223 and the route 235.

By thus applying the load distribution control technique according to the present embodiment, it becomes possible to select a radio communication route by associating the reliability required of the transmission data with reliability of a radio communication route. It thus becomes possible to reconcile the real time property and the reliability in the vehicle control radio communication system.

Figure 12:
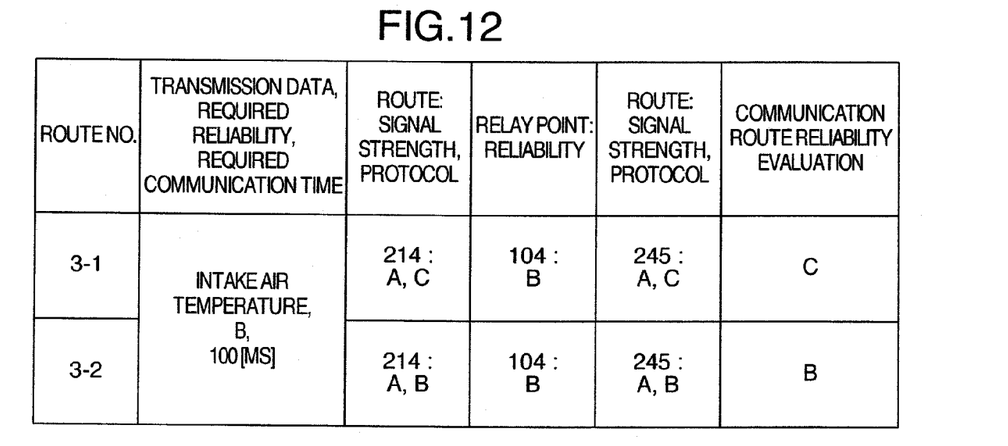
FIG. 12 is a diagram showing an outline example of protocol alteration processing.

FIG. 12 is a diagram showing details of the processing for altering the protocol of the radio communication route conducted at the step S156 in FIG. 9. Here, attention is paid only to a route No. 3-1 for communication from the transmission node 101 to the reception node 105 via the relay node 104. The initial state of the route is supposed to be 3-1. The route 3-1 has the rank C in the route 214 and the route 245, because the protocol has no error correction function, resulting in the communication route reliability evaluation C. Therefore, the required reliability of the transmission data cannot be satisfied. Accordingly, by altering the protocol in the route 214 and the route 245 to a protocol having the check sum function (rank B), the reliability of the communication route is improved and a route satisfying the required reliability is generated.

Figure 13:
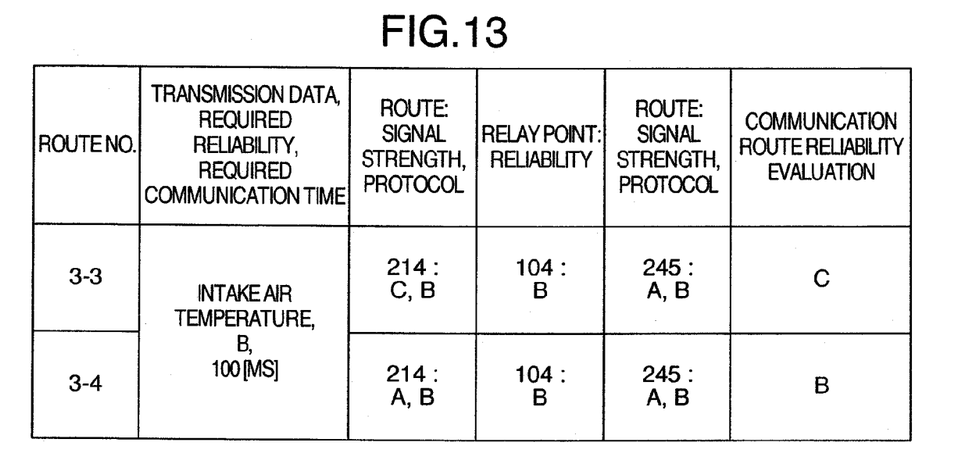
FIG. 13 is a diagram showing an outline of signal strength alteration processing.

FIG. 13 is a diagram showing details of the processing for altering the signal strength of the radio communication route conducted at the step S156 in FIG. 9. Here, attention is paid only to a route No. 3-3 for communication from the transmission node 101 to the reception node 105 via the relay node 104. The initial state of the route is supposed to be 3-3. The route 3-3 has a comparatively weak strength C as the signal strength in the route 214, resulting in the communication route reliability evaluation C. Therefore, the required reliability of the transmission data cannot be satisfied. Accordingly, by raising the radio communication output in the route 214, the signal strength is changed to A and the reliability of the communication route is improved. Thus, a route satisfying the required reliability is generated.

It is now supposed that a radio communication route at the time of system design cannot be used because of a failure or the like in, for example, a relay node and a substitute route should be used. Even if in this case the reliability of the substitute route is low and the required reliability of the transmission data cannot be satisfied, a communication route satisfying the required reliability can be generated by altering the signal strength and the protocol, resulting in an effect.

Figure 14:
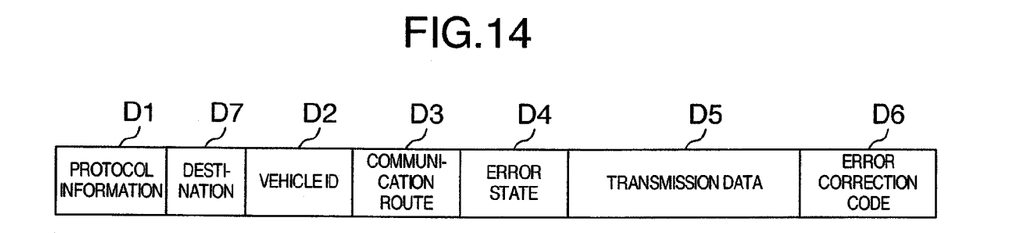
FIG. 14 is a diagram showing a format of transmission data.

FIG. 14 shows a format of data transmitted and received in the vehicle control radio communication system according to the present embodiment. D1 denotes protocol information of transmission data. D2 denotes a vehicle ID, and it is an identification ID of a vehicle to which the transmission data belongs. Here, data transmitted and received in a radio communication network of a neighboring vehicle is prevented from being falsely received by registering a number unique to the vehicle, such as a chassis number. D3 denotes communication route information, and information concerning a relay point via which the transmission data arrives at the transmission destination node is registered in D3. D4 denotes an error state, and it represents that the transmission data is transmitted with reliability that is lower than the required reliability. D5 denotes the transmission data. D6 denotes an error correction code, and the CRC, check sum or parity is used according to the required reliability of the transmission data. D7 denotes the destination of the transmission data, and a node that should receive the present data is specified. It is possible to determine whether to receive and process the present data, by interpreting the destination information.

Figure 15:
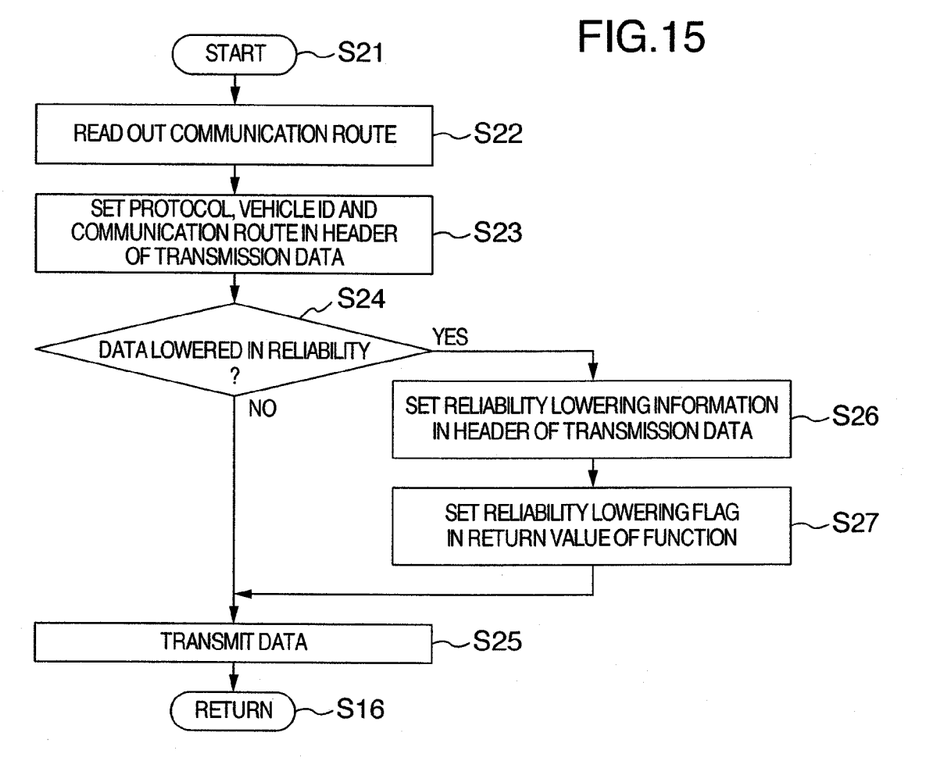
FIG. 15 is a flow chart diagram showing a flow of data transmission processing.

FIG. 15 is a flow chart diagram showing a flow of data transmission processing executed when the nodes 101 to 104 shown in FIG. 2 transmit data to the node 105. The flow chart will now be described referring to FIG. 14 as well. The data transmission processing is device driver software operating in the software 17 on the transmission node. The device driver software is called as a function by the framework or another control application to start its operation. The data transmission processing is started from step S21 (START). First, communication relay route information associated with data to be transmitted is read out at step S22. The route read out at this time is the communication route, the protocol, the signal strength, and the vehicle ID given as the notice by the ECU 105 at the step S158 and stored in a memory which is provided on the node and which is not illustrated. Subsequently at step S23, the communication protocol and the signal strength are set in the protocol information part D1 in the transmission data. The vehicle ID is set in the vehicle ID part 2, and the communication relay route is set in the communication route information part D3. Subsequently, it is checked at step S24 whether the data is data lowered in reliability at the step S157. If the reliability is not lowered (no), the processing proceeds to step S25 and the data is transmitted. If the reliability is lowered (yes), the processing proceeds to step S26. At the step S26, information representing that the reliability has been lowered is set in the header D4 of the transmission data. At step S27, a flag indicating that the reliability is lowered is set as a return value of the function f the present transmission processing, and the processing proceeds to the step S25. At the step S25, the transmission data is delivered to the radio communication unit 16 and data transmission is conducted.

Figure 16:
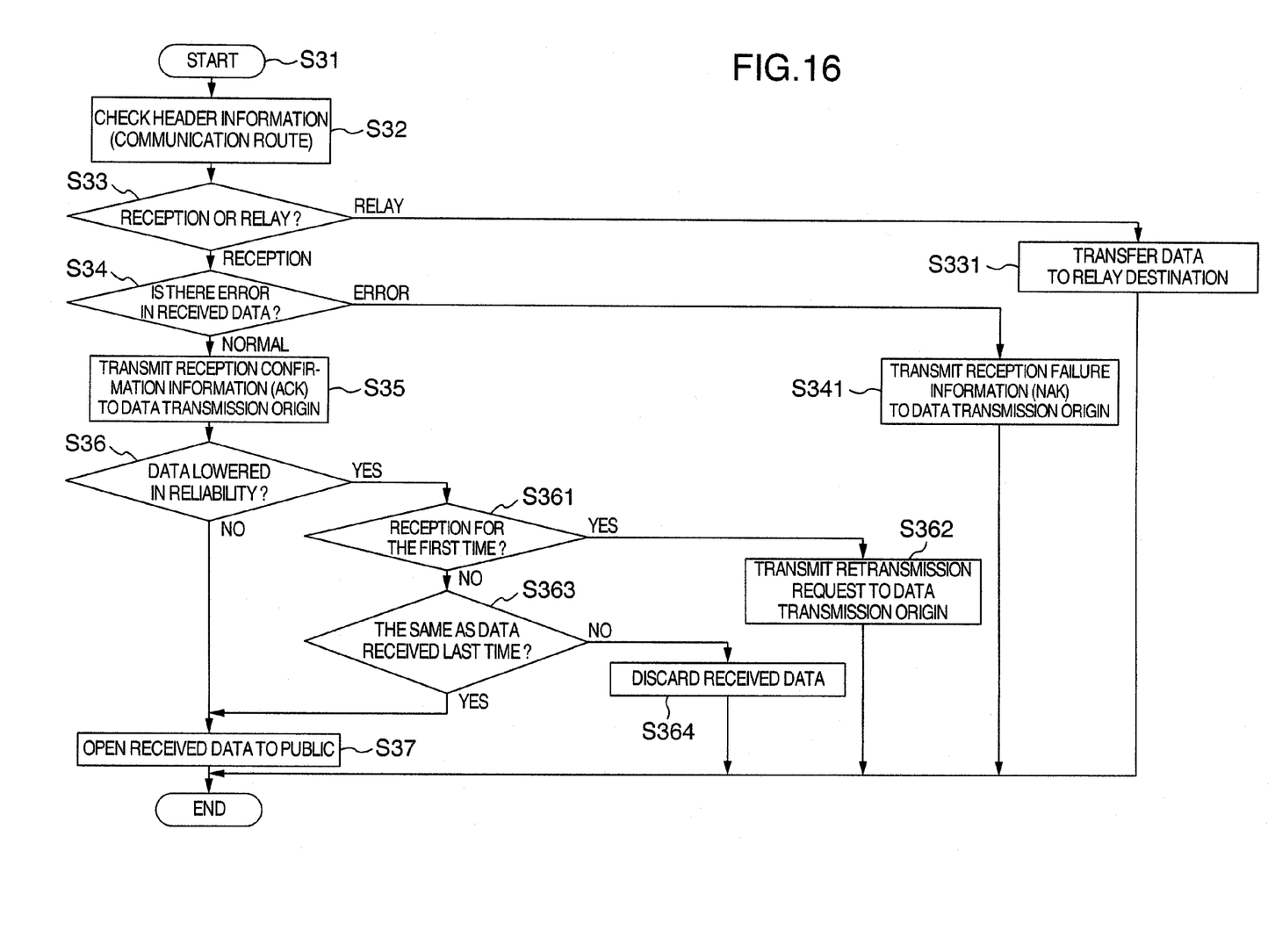
FIG. 16 is a flow chart diagram showing a flow of data reception processing.

FIG. 16 is a flow chart diagram showing an outline of a flow of data reception and relay processing. Upon receiving radio communication in the radio communication unit 16, each of the radio communication nodes 101 to 105 interprets the destination information D7 in the header and determines whether data is data to be subject to reception processing by itself. If information indicating the own node is entered in D7, the node judges that the node should conduct processing on the data and reception and relay processing is started from step S31 (START). At step S32, the node checks the communication route header D3 (FIG. 14), and determines whether the own node is the final point in the communication route, i.e., the reception node, or a relay node (step S33). If the own node is the reception node at the step S33, the processing proceeds to (reception) step S34. If the own node is a relay node, the processing proceeds to (relay) step S331. At the step S331, the node rewrites the destination header, then transmits communication data to a relay destination node which becomes the next communication route of the own node, and finishes the processing. At step S34, the node determines whether there is an error in the received data by using the error correction code D6. If data can be received normally or recovery from an error can be conducted, the processing proceeds to step S35. If an unrecoverable error is detected, the processing proceeds to step S341. At the step S341, the node sets a route having an order opposite to that used at the time of vehicle control data transmission, transmits data (NAK) indicating the reception failure to a data transmission origin, transmits the data (NAK) indicating the reception failure to the ECU 10 serving as the server of the radio communication subsystem for engine, and finishes the processing. At the step S35, the node sets a route having an order opposite to that used at the time of vehicle control data transmission, and transmits data (ACK) indicating the reception success to the data transmission origin. Subsequently, at step S36, the node checks the error state header D4, and determines whether the transmitted data is data lowered in reliability. If the data is not data lowered in reliability, the processing proceeds to step S37. If the data is data lowered in reliability, the processing proceeds to step S361. At the step S361, the node determines whether the data reception is conducted for the first time. If the data reception is conducted for the first time, the processing proceeds to step S362, and the node transmits a retransmission request to the data transmission origin and then finishes the processing. If the data reception is not conducted for the first time, the processing proceeds to step S363. At the step S363, it is determined whether the data is the same as the data received the last time (for the first time). If the data is the same, the processing proceeds to step S37. If the data is not the same, the processing proceeds to step S364 and the node discards the data and finishes the processing (END). At the step S37, the node sets a reception completion flag or starts a task for reception completion processing, and opens the transmission data part D5 in the received data to the public.

Figure 17:
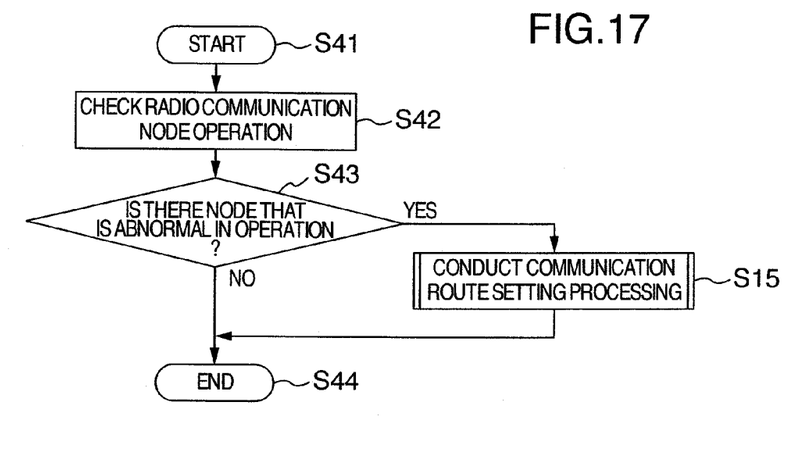
FIG. 17 is a flow chart diagram showing a flow of radio communication route state check processing.

FIG. 17 shows communication route confirmation processing executed regularly, or when the communication load is low, or when the reception failure information (NAK) has been received. The processing is started from step S41 (START). At step S42, the ECU 105 inquires of the communication node whether the radio communication node is operating normally and whether the state of communication with another node is good. At step S43, branching is conducted depending on whether there is a node that is abnormal in operation. If there are no abnormal nodes (no), the processing is finished. If there is an abnormal node (yes), the communication route setting processing step S15 described earlier is conducted and then the processing is finished.

Heretofore, the outline of the vehicle control radio communication system according to the present embodiment has been described. However, the present invention is not limited to the embodiments heretofore described, but the present invention can be implemented in various forms without departing from the spirit of the invention.

Figure 18:
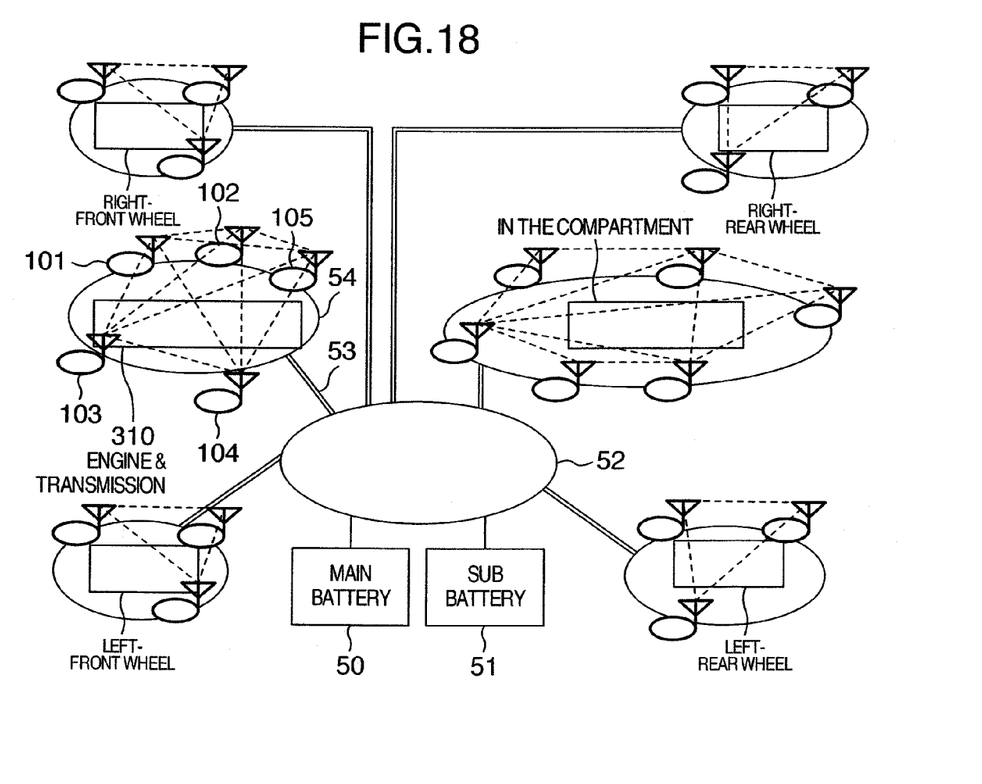
FIG. 18 is a diagram showing a configuration example of a vehicle control radio communication system according to another embodiment of the present invention.

For example, as shown in FIG. 18, the electric power line 54 of the engine-transmission radio communication subsystem may be connected to the sensor nodes. Furthermore, in addition to the radio communication, electric power line communication utilizing voltage amplitude in a frequency band different from the frequency band of the supply electric power may also be used on the electric power line. By using the radio communication and the electric power line communication together, multiplexing in different communication schemes becomes possible. As compared with duplexing in the same scheme, therefore, it brings about an effect that the failure probability due to the same factor is reduced and the reliability is improved.

Figure 19:
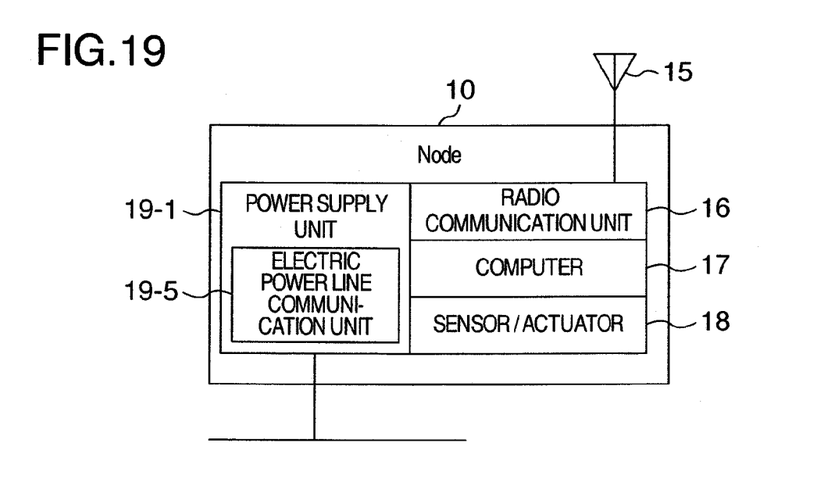
FIG. 19 is a diagram showing an outline of a communication system using radio communication and electric power line carrier together.

FIG. 19 is a diagram showing a configuration example of a communication node in the case where the electric power line communication is adopted in FIG. 18. The power supply unit 19-1 incorporates an electric power line communication unit 19-5 to conduct communication together with the radio communication unit 16. At this time, the electric power line communication may be activated only at the time of a failure of the radio communication unit.

According to the system according to the present embodiment, it becomes possible in the vehicle control radio communication system to reconcile the real time property and reliability of the system by associating reliability required of data with reliability of a radio communication route, selecting a communication route, and distributing the load.

According to the vehicle control radio communication system according to the embodiments, the load in the radio transmission line can be distributed by associating reliability required of data with reliability of a radio communication route and selecting a radio communication route as heretofore described. This results in an advantage that the real time property (real time response property) and reliability concerning the radio transmission can be ensured in the vehicle control radio communication system.

The present invention can be used in a vehicle control radio communication system.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A vehicle control apparatus which includes at least one of a sensor measuring a vehicle state or a driver's manipulated variable, a calculating means for calculating a control target value of a control actuator in the vehicle and an actuator driven based on the control target value, and further includes a radio communication means for transmitting/receiving over one of a plurality of radio communication routes having assigned reliability levels at least one of a value measured by the sensor and the control target value as a transmission data,
   wherein a communication limit time and a required reliability are set for the transmission data,
   the vehicle control apparatus includes load distribution means for selecting a radio communication route that satisfies a lowest required reliability of the transmission data when a plurality of radio communication routes satisfying the communication limit time of the transmission data are present.

2. The vehicle control apparatus according to claim 1, wherein the required reliability of the transmission data is specified as a required success rate or an allowable failure rate.

3. The vehicle control apparatus according to claim 1, wherein if a communication route satisfying the required reliability of the transmission data is not present, a radio communication route is generated so as to satisfy the required reliability of the transmission data.

4. The vehicle control apparatus according to claim 1, wherein if a communication route satisfying the required reliability of the transmission data is not present, a radio communication route satisfying the required reliability of the transmission data is generated by altering a protocol for radio communication to a protocol having higher reliability.

5. The vehicle control apparatus according to claim 1, wherein if a communication route satisfying the required reliability of the transmission data is not present, a radio communication route satisfying the required reliability of the transmission data is generated by enhancing signal strength at time of radio communication.

6. The vehicle control apparatus according to claim 1, wherein
   if a communication route satisfying the required reliability of the transmission data is not present, the required reliability of the transmission data is lowered and a radio communication route is selected so as to satisfy the lowered required reliability, and
   data provided with information indicating that the required reliability of the transmission data has been lowered is transmitted, and a notice to that effect is sent to a transmission request origin of the transmission data.

7. The vehicle control apparatus according to claim 6, wherein the vehicle control apparatus that has received transmission data lowered in required reliability of the transmission data receives the transmission data lowered in required reliability a plurality of times and conducts reliability evaluation of the transmission data.

8. The vehicle control apparatus according to claim 1, wherein reliability of a radio communication route including the vehicle control apparatus having lowered reliability is reevaluated and the radio communication route is reestablished according to the required reliability of the transmission data if reliability of said vehicle control apparatus has lowered.

9. The vehicle control apparatus according to claim 1, wherein if a first vehicle control apparatus has found reliability lowering in a second vehicle control apparatus different from the first vehicle control apparatus, the first vehicle control apparatus sends a notice of the reliability lowering information to a third vehicle control apparatus different from the first and second vehicle control apparatuses.

10. The vehicle control apparatus according to claim 9, wherein communication between the vehicle control apparatuses is conducted by jointly using electric power line carrier communication using an electric power supply line.

11. The vehicle control apparatus according to claim 10, wherein communication between vehicle control apparatuses is conducted by using electric power line carrier communication using an electric power supply line at time of abnormality in radio communication.

12. The vehicle control apparatus according to claim 1, wherein said load distribution means selects a radio communication route leading from the vehicle control apparatus to a vehicle control apparatus receiver on the basis of the required reliability of the transmission data and reliability of the radio communication routes.

13. The vehicle control apparatus according to claim 12, wherein said load distribution means select a radio communication route candidate having a lower value as regards reliability of radio communication route candidates as long as the radio communication route satisfies the required reliability of the transmission data.

14. The vehicle control apparatus according to claim 12, wherein the reliability of the radio communication routes and the required reliability of the transmission data are classified on the basis of previously evaluated thresholds.

15. The vehicle control apparatus according to claim 12, further comprising a relay node disposed in said radio communication route from a transmitter of the vehicle control apparatus to said receiver of the vehicle control apparatus, wherein the reliability of the radio communication routes is calculated on the basis of at least one of a failure rate of the relay node and a communication parameter including a communication protocol or communication strength.

16. The vehicle control apparatus according to claim 12, wherein
    reliability of the radio communication routes and the required reliability of transmission data are classified into a plurality of groups,
    a reliability group of selectable radio communication routes is associated with a required reliability group of transmission data, and
    a radio communication route from a transmitter of the vehicle control apparatus to said receiver of the vehicle control apparatus is selected.

17. The vehicle control apparatus according to claim 12, wherein
    when the radio communication route from a transmitter of the vehicle control apparatus to said receiver of the vehicle control apparatus is to be selected on the basis of the required reliability of the transmission data and reliability of the radio communication routes, an evaluation calculation expression for evaluating a communication route on the basis of a required communication time and reliability of the radio communication route is set so as to be associated with transmission data, and
    a communication route having a high evaluation mark calculated by using the evaluation calculation expression is selected.

* * * * *